United States Patent
Schroeder et al.

(10) Patent No.: US 8,548,893 B2
(45) Date of Patent: Oct. 1, 2013

(54) SYSTEMS AND METHODS FOR AUTOMATED REPURCHASE AGREEMENT MATCHING

(75) Inventors: Michael Schroeder, New York, NY (US); James Malgieri, Eatontown, NJ (US); Charles Austin, Stamford, CT (US)

(73) Assignee: The Bank of New York, New York, NY (US)

( * ) Notice: Subject to any disclaimer, the term of this patent is extended or adjusted under 35 U.S.C. 154(b) by 710 days.

(21) Appl. No.: 11/352,294

(22) Filed: Feb. 13, 2006

(65) Prior Publication Data
US 2007/0192225 A1     Aug. 16, 2007

(51) Int. Cl.
*G06Q 40/00*     (2012.01)
(52) U.S. Cl.
USPC .............................................. 705/37; 705/35
(58) Field of Classification Search
USPC .......................................................... 705/35
See application file for complete search history.

(56) References Cited

U.S. PATENT DOCUMENTS

| 5,802,499 A | | 9/1998 | Sampson |
| 6,016,482 A | * | 1/2000 | Molinari et al. ................ 705/35 |
| 2001/0037284 A1 | * | 11/2001 | Finkelstein et al. ............ 705/37 |
| 2003/0023539 A1 | * | 1/2003 | Wilce et al. ..................... 705/37 |
| 2004/0093301 A1 | * | 5/2004 | Fitzpatrick et al. ............. 705/37 |

OTHER PUBLICATIONS

Overnight Interbank Loan Markets. Demiralp, Preslopsky, and Whitesell. May 2004.*
Repurchase and Reverse Repurchase Agreements. Lumpkin. 1998.*
The Repurchase Agreement (Repo) Market. Acharya and Oncu. Sep. 22, 2010.*
International Search Report issued in PCT/US2007/62030, Sep. 12, 2007, 2 pages.
Written Opinion of the Searching Authority issued in PCT/US2007/62030, Sep. 12, 2007, 5 pages.
"Triparty Repo User Guide," Feb. 2005, pp. 1-76, Euroclear Bank SA/NV, Brussels, Belgium.

* cited by examiner

*Primary Examiner* — Hani M Kazimi
*Assistant Examiner* — John Preston
(74) *Attorney, Agent, or Firm* — Pillsbury Winthrop Shaw Pittman LLP (57) ABSTRACT

A system and method for facilitating tri-party repurchase (or other) agreement transactions. A dealer or trader sends instructions to an intermediary third party characterizing a previously agreed-upon set of terms for a repurchase agreement between the dealer and an investor. The parties can thereafter approve or reject the deal allegement via an on-line system. In addition to, or instead of, dealer or investor approval, an instruction matching utility is provided to automatically or substantially automatically match instructions received from dealers and investors related to a plurality of deal allegements. In either case the status of the trade will be displayed to all parties.

28 Claims, 7 Drawing Sheets

SYSTEMS AND METHODS FOR AUTOMATED REPURCHASE AGREEMENT MATCHING

BACKGROUND

The present invention relates to administering and facilitating financial transactions. More specifically, the present invention relates to automated handling of financial transactions known as Tri-Party Repurchase Agreements, which are also commonly known as tri-party "repo" agreements.

A repurchase agreement or "repo" agreement (or, simply, "repo") is a contract in which one party, the Seller, sells securities to another party, the Buyer, and agrees to repurchase the securities at a later date at a specified price. Generally speaking, a repo agreement is a form of collateralized short term borrowing for dealers in government securities. The dealer sells the government securities to investors, usually on an overnight basis, and buys them back the following day. For the party (e.g., dealer) selling the security (and agreeing to repurchase it in the future) it is a "repo"; for the party (e.g., investor) on the other end of the transaction (buying the security and agreeing to sell in the future), it is a "reverse repurchase agreement." However, the transaction is often just simply termed a "repo" by both parties.

A repo is similar to a secured loan, with the lender of money receiving securities as collateral to protect against default. Under a UK repo agreement, legal title to the securities passes from the dealer or seller, i.e., the provider of the collateral, to the investor, i.e., the party providing the money. (No title transfer occurs under U.S. law.) Either a U.S. agreement or a U.K agreement may be utilized, based on what the dealer and investor require. Coupons that are paid out on the securities during the life of the loan are transferred to the original owner of the security, regardless of which agreement is used.

For the buyer or investor, a repo is an opportunity to invest cash for a custom period of time, typically overnight, as mentioned. Moreover, a repo is a short-term and secure investment; in return for investing, the investor receives a rate of interest as well as collateral to secure the investment. Market liquidity for repos is good and yields are competitive to comparable length investments.

For the dealer or seller, repos are used to cost effectively finance long positions.

The size of the global repo market is substantial. The US Federal Reserve and the European Repo Council (a body of the International Securities Market Association) both try to estimate the size of their respective repo markets. At the end of 2004, the US repo market reached USD 5 trillion and the European repo market passed EUR 5 trillion in outstandings.

In practice, a repo agreement can be transacted in several ways. In a first way, the investor and the dealer negotiate with one another and close an agreed-to deal without any outside assistance. The dealer then would deliver securities to the investor and the investor would deliver cash to the dealer. This is typically referred to as a 'delivery repo'.

A second, more common way to effect a repo transaction is to involve a trusted third party, or intermediary, to match the details of the trade agreed between the Seller and the Buyer, and to assume all of the post trade processing and settlement work related to the trade. The third party is typically a bank. Indeed, one of the primary lines of business of the Broker Dealer Services Division of the Bank of New York ("BNY") (the assignee of the subject matter described herein) is the provision of "tri-party services." In a tri-party transaction, The Bank of New York acts as a service provider to two principals in an underlying trade. Typical types of underlying trades include not only repurchase agreements, but also securities lending agreements, derivatives agreements and others.

For example, one type of securities lending agreement comprises a borrow/pledge type transaction. A triparty borrow/pledge transaction is a transaction where a borrower of securities, typically a broker dealer, agrees to borrow securities from a securities lender, although unlike a typical securities lending agreement, where the borrower collateralizes the value of the loan with cash, in a triparty borrow/pledge transaction, the borrower collateralizes the lender with other securities, typically through a third party custodian bank. The transaction flow is similar to the triparty repo flow, except that no cash moves through the third party custodian.

In a tri-party borrow/pledge transaction, the two principals to the trade inform BNY of the value of the underlying loan on a daily basis. BNY matches the instructions received from borrower and lender, and the borrower provides securities to BNY to be pledged as collateral. BNY utilizes a collateral allocation engine to screen collateral for eligibility, apply margin and properly allocate collateral to a segregated account in the name of the lender.

BNY also delivers reporting that provides the amount of collateral required, and detailed valuation of each line pledged.

Generally speaking, a securities lending transaction is a means for broker dealers to borrow securities so that it is able to cover a short position or satisfy its need for the security. The transaction may last a single day, or it may be open-ended. For the lender, the transaction is an opportunity to earn a return on assets it holds in its inventory.

Notwithstanding the several different types of triparty agreements that may be handled, repurchase agreements typically make up approximately 80% of the tri-party trades in the Broker Dealer Services Division of BNY, and is thus a significant portion of the tri-party business.

Figure 1:
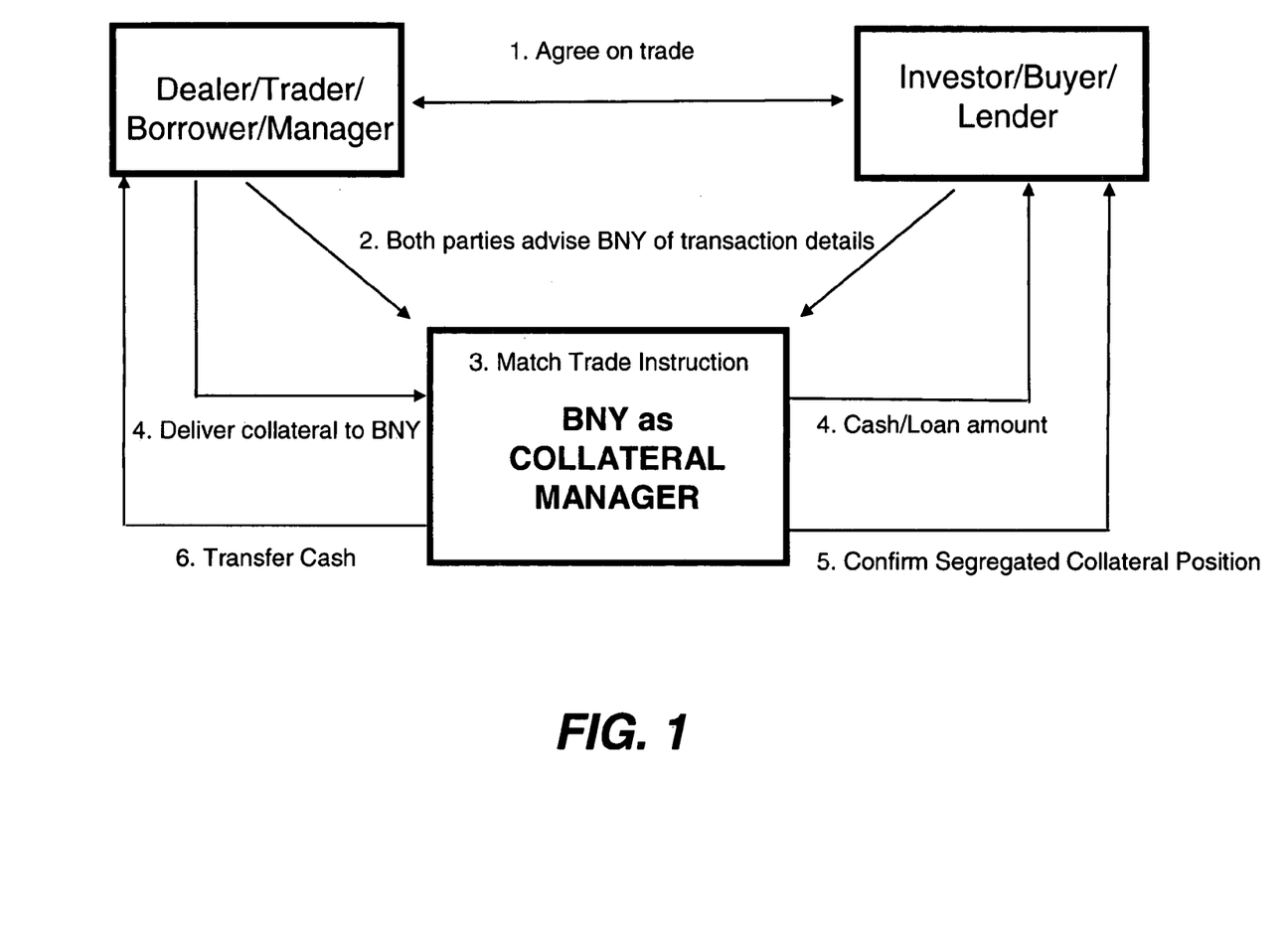
FIG. 1 shows the parties and respective relationships in a tri-party Repurchase Agreement transaction.

FIG. 1, shows a generic transaction flow for a tri-party repurchase agreement where a service provider (typically a custodian bank) is disposed (logically speaking) in the middle of the transaction to ensure that each party is never without either cash or securities throughout the term of the transaction, thereby ensuring that both parties are "whole" at all times. The presence of the third party bank not only brings an additional layer of security to the transaction, but it also brings efficiencies and reduced costs for both principals to the trade.

In the tri-party repurchase agreement transaction flow shown in FIG. 1, a dealer/seller/borrower/trader and an investor/buyer/lender first agree, between themselves, on a particular trade (Step 1). Thereafter, The Bank of New York receives a trade instruction from both the dealer and the investor (Step 2). Most of the large dealers have dedicated telephone-line-based connections into The Bank of New York, over which they provide their tri-party repo deal instruction. This instruction is typically delivered in the form of an electronic message that includes several distinct fields of information, which load into a collateral management system (which are well-known in the art). However, a typical investor does not have such an electronic connection, and thus usually sends repo transaction instructions to the bank via fax, or sometimes by email, or even by regular telephone call. In accordance with longstanding practice, a BNY account administrator must then match (Step 3) the faxed (or emailed or telephone call) instructions from the investor to the electronically-provided instruction received from the dealer. This matching step is performed manually by looking at each relevant field to ensure that it matches the fields in the instruction received from the dealer. Preferably, the minimum or mandatory fields that must match include:

Account ID
Deal amount
Start Date
End Date
Rate
Seller
Buyer
Optional fields that are reviewed for matching include:
Indicator of type of collateral to allocate
Reference number Once a match has been confirmed by the account administrator, the dealer delivers the collateral (e.g., Treasury Bills) to The Bank of New York and, at essentially the same time, the investor delivers the agreed-upon cash or loan amount to The Bank of New York (Step 4). The Bank of New York thereafter confirms to the investor that the collateral is eligible per the tri-party agreement, and applies applicable margin to each line of collateral, also per the tri-party agreement. This collateral is segregated in an account established in the name of the investor (Step 5). The Bank of New York also transfers the cash/loan amount to the dealer (Step 6).

SUMMARY OF THE INVENTION

Embodiments of the present invention overcome deficiencies in the prior art by automating, in a substantial fashion, the approval and matching of Tri-Party Repurchase Agreements that a dealer and investor have previously agreed to. Rather than only the trader or dealer having access to a trusted third party's back end systems, the buyer/investor, in accordance with the principles of the present invention, is provided similar access such that the terms of any given repo transaction can be viewed in real time by both parties and more easily approved and matched by a computer. Terms and repo agreements can also be automatically matched, rather than manually matched by a bank (or other third party) employee, as is commonplace in the prior art.

More specifically, the-tri-party deal matching systems and methods in accordance with embodiments of the present invention allow for certain automation of the process to match tri-party deals. The matching functionality allows tri-party investors to access a Bank of New York web site, for example, and enter a username and password, which may be provided by BNY. (As used herein, "BNY" should be understood to mean any third party in a tri-party transaction.) From such a website, investors can request a particular web page which will display all of the tri-party deals that have been delivered to BNY by the different repo traders/sellers with whom they have supposed agreed deals. The repo investor, with the click of a mouse, can then approve or 'match' the trade, or 'not match' the trade. Once a trade has been matched, it is ready for further processing.

In accordance with another aspect of the present invention, if an investor has a large number of trades, and prefers not to match those trades via a web page, the investor may alternatively send either a data file or individual electronic messages that contain the details of his trades. A deal matching engine may thereafter analyze the two sets of instructions (one from the dealer, the other from the investor), and match the trade if all mandatory fields match. The fact that a deal has been matched may be displayed to the dealer and investor via a web page, or, if a given deal can not be matched, that fact may likewise be displayed on the web page. Reasons for failed matching may also be displayed for the investor and dealer so that they can act on such information immediately. This functionality overcomes the need for telephone calls among the parties to ascertain the reason(s) for failed matches.

In still another aspect of the present invention, it is contemplated that tri-party repo investors will become very comfortable with this unique automated process such that The Bank of New York may end up serving as a single point through which investors choose to match all of their tri-party repo trades, even those trades that are processed by other tri-party custodian banks or financial institutions. In other words, the systems and methods of the present invention can be scaled and configured to function as a global matching service to substantially all of the tri-party repo industry, generally, and not just for deals being handled by a single third party.

As will be appreciated by those skilled in the art, embodiments of the present invention introduce desirable efficiencies for tri-party repo transactions. Whereas, in the prior art, employees of the third-party would have to manually match, for example, incoming faxed instructions with instructions received electronically from another party, it is now possible to substantially automate this step and further to provide feedback to the parties to the transaction, thereby facilitating the entirety of the transaction. Those skilled in the art will also appreciate that the systems and methods described herein are not limited to tri-party repo transactions, but may also have applicability to other tri-party transactions including, but not limited to, securities lending agreements and derivatives agreements.

These and other features of the present invention and their attendant advantages will be more fully appreciated upon reading the following detailed description in conjunction with the several associated drawings.

DETAILED DESCRIPTION

Embodiments of the present invention provide access to both investors and dealers in Repurchase Agreement transactions via computing and communications infrastructure provided, at least in part, by a third party, to facilitate and make more efficient tri-party repo transactions. Because repo transactions are not confined to the United States, embodiments of the present invention also contemplate and address how global investors might access and employ the systems and methodologies described herein.

Embodiments of the present invention may be implemented with varying degrees of automation. In one embodiment, an investor is given an opportunity to "check off" or approve a particular proposed deal, transaction, or "allegement" entered by a dealer. In other embodiments, the "check off" right is given to the dealer to confirm an investor-entered allegement. This right of approval may also be given to both parties, in accordance with the principles of the present invention. In addition, embodiments of the present invention provide matching functionality to match dealer and investor transactions in the context of confirming a particular allegement. Matching may be performed manually as well as substantially automatically. In the latter (automatic) case, once the terms of a particular deal have been entered by the parties into the system provided by the third party (e.g., The Bank of New York), matching is performed without further input from the trader/seller/dealer and buyer/investor parties.

In addition, future dated transactions can be supported by the several embodiments of the present invention such that investors and dealers can input allegements for transactions that are to take place in the future, namely a date of T+one or greater, where T is today. When future dated transactions are supported by the system, they are preferably matched as soon as possible within the system described herein. Once matched, such transaction will thereafter be submitted to a "live mode" system on the appropriate future date. The "live mode" reflects the current day's activity, which is to be processed that day, and is kept apart from future dated activity, to be processed on the appropriate future date.

Figure 2:
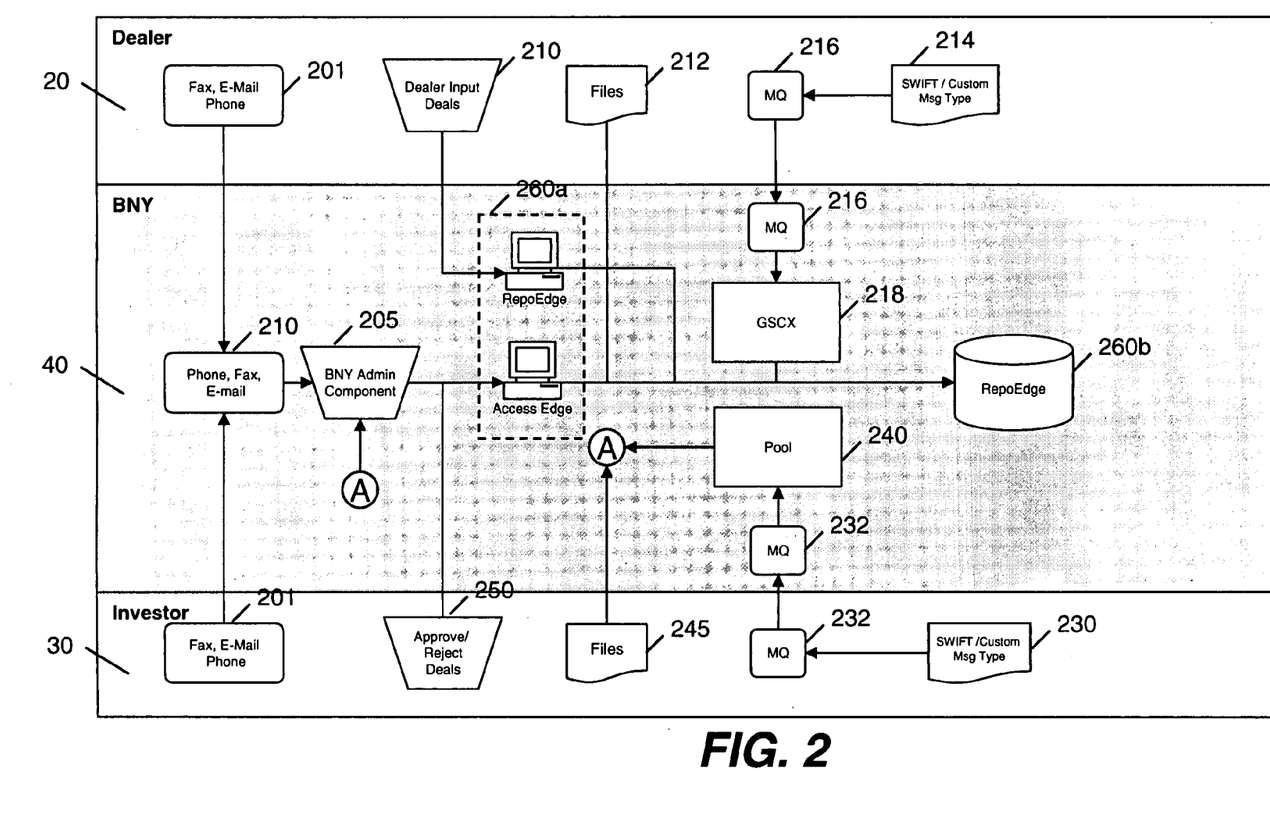
FIGS. 2-7 illustrate several embodiments of the present invention.

FIG. 2 illustrates an embodiment of the present invention in which "check box" approve/reject functionality is provided to an investor to approve or reject repurchase agreement transactions previously entered into a system by a dealer. Specifically, FIG. 2 shows the relationships among a dealer 20, an investor 30 and The Bank of New York 40. Of course, those skilled in the art will appreciate that BNY 40 could be replaced by any third party financial institution capable of handling tri-party repo transactions.

As shown, dealer 20 and investor 30 can, as is well-known in the art, send faxes and emails, as well as place telephone calls 201 to BNY 40. The information provided in this fashion is entered into an overall system 260a, 260b that is responsible for keeping track of the plurality of allegements that are uploaded thereto. Generally speaking, there is an administration component 205 (including personnel) that is disposed between the received telephone calls, faxes and emails, and system 260a, 260b.

As further shown, dealer 20 inputs deals, or allegements, 210 (or terms characterizing such deals) directly into system 260a where they are stored in a database 260b that is shown towards the right hand side of FIG. 2. In addition, dealer 20 has access to files 212 that may be loaded into system 260. Similarly, dealer 20 may send SWIFT (Society for the Worldwide Interbank Financial Telecommunication) or custom messages 214 through a message queue 216 and GSCX 218 (BNY's version of a government securities clearance and settlement application), which messages are stored or acted upon by system 260a, 260b. Typical messages 214 might include the several mandatory and optional data fields outlined above. A sample SWIFT formatted message is provided below:

Sample: MT527 Overnight tri-party collateral management transaction initiation for GSCX account XXX and tri-party account YYYYYY :16R:GENL
:20C::SEME//INSTR-0000000001
:20C::CLCI//INSTR-00000000001
:20C::SCTR//DEAL-00000000001
:23G:NEWM
:98A::PREP//20050423
:98A::EXRQ//20050423
:22H::CINT//INIT
:22H::COLA//REPO
:22H::REPR//PROV
:16R:COLLPRTY
:95P::PTYA//SOGEUS33
:97A::SAFE//XXX
:16S:COLLPRTY
:16R:COLLPRTY
:95Q::PTYB//CONTRA PARTY NAME
:97A::SAFE//YYYYYY -continued Sample: MT527 Overnight tri-party collateral management transaction initiation for GSCX account XXX and tri-party account YYYYYY :16S:COLLPRTY
:16R:COLLPRTY
:95P::TRAG//IRVTUS3NBDS
:16S:COLLPRTY
:16S:GENL
:16R:DEALTRAN
:98A::TERM//20050426
:19A::TRAA//USD100000,
:92A::PRIC//3,1275
:16S:DEALTRAN In a similar fashion, investor 30 may also send SWIFT messages 230 through message queue 232 into pool 240, which is another application designed to accept certain instructions from certain clients, and route those instructions to the proper division within BNY for processing. Files 245 may also be uploaded by investor 30. Both messages 230 and files 245 are received by administration component 205 as shown by reference letter A.

In accordance with the principles of the present invention, investor 30 has the ability to approve and/or reject selected deals or allegements as shown by reference numeral 250. In one possible embodiment, a status screen (not shown) is supplied via, e.g., an internet connection via which investor 30 can either approve or reject a given allegement. Preferably, not only does investor 30 have the ability to view a particular allegement and approve or reject the deal, but dealer 20 may also be provided with a similar screen so that, if a discrepancy arises, dealer 20 may quickly ascertain the reason for rejection. In another possible implementation, not only does investor 30 have the ability to approve or reject alleged deals via a status screen, but personnel working in conjunction with BNY 40 (as part of, e.g., administrative component 205) may also access such a screen on behalf of investor 30 and, in response to a particular fax, email or telephone call, effect the investor's wishes.

As mentioned, if a given allegement or deal is approved by investor 30, that deal is thereafter deemed to be "matched," and thereafter processed accordingly. Also, access to the deal status screen is preferably protected by password and investor identification. For reporting purposes, both the investor ID and a time stamp indicative of the approval/rejection time is captured by system 260a, 260b.

For those deals that have been rejected by investors, dealer 20 may be provided access to system 260a, 260b to add, modify or cancel unmatched deal instructions.

Figure 3:
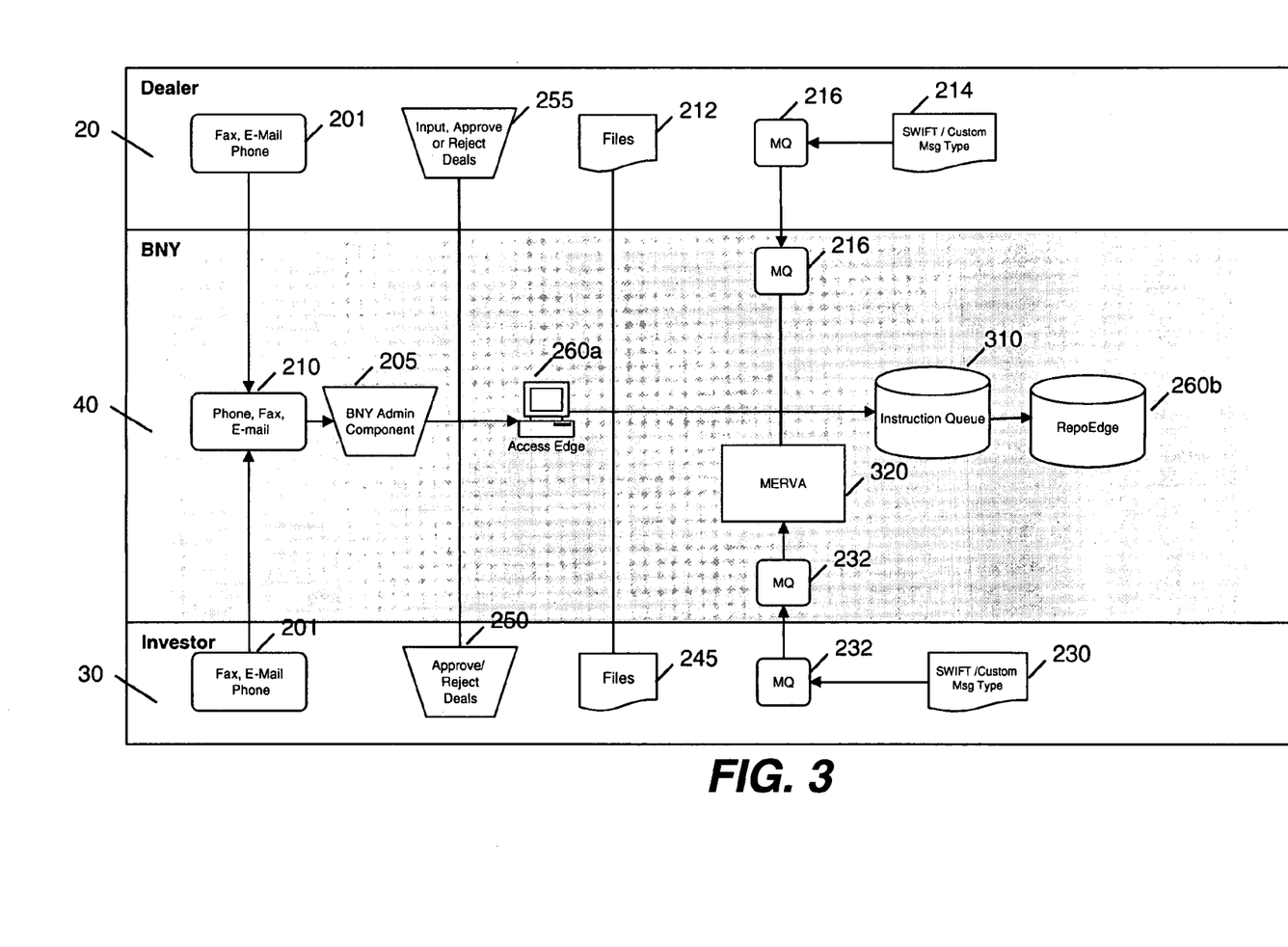

FIG. 3 depicts a slightly modified architecture as compared to FIG. 2. As shown, not only does investor 30 have the ability to approve or reject deals via a deal status screen, but dealer 20 may also have this capability in accordance with this embodiment of the present invention. Likewise, investor 30 is given the opportunity to input terms of deals in the first place.

Also shown is MERVA 320, which is a router used to direct incoming instruction traffic, in this case from investors.

Also added to the architecture of this embodiment is an instruction queue 310 that captures instructions that are to be matched and organizes them for further processing.

Figure 4:
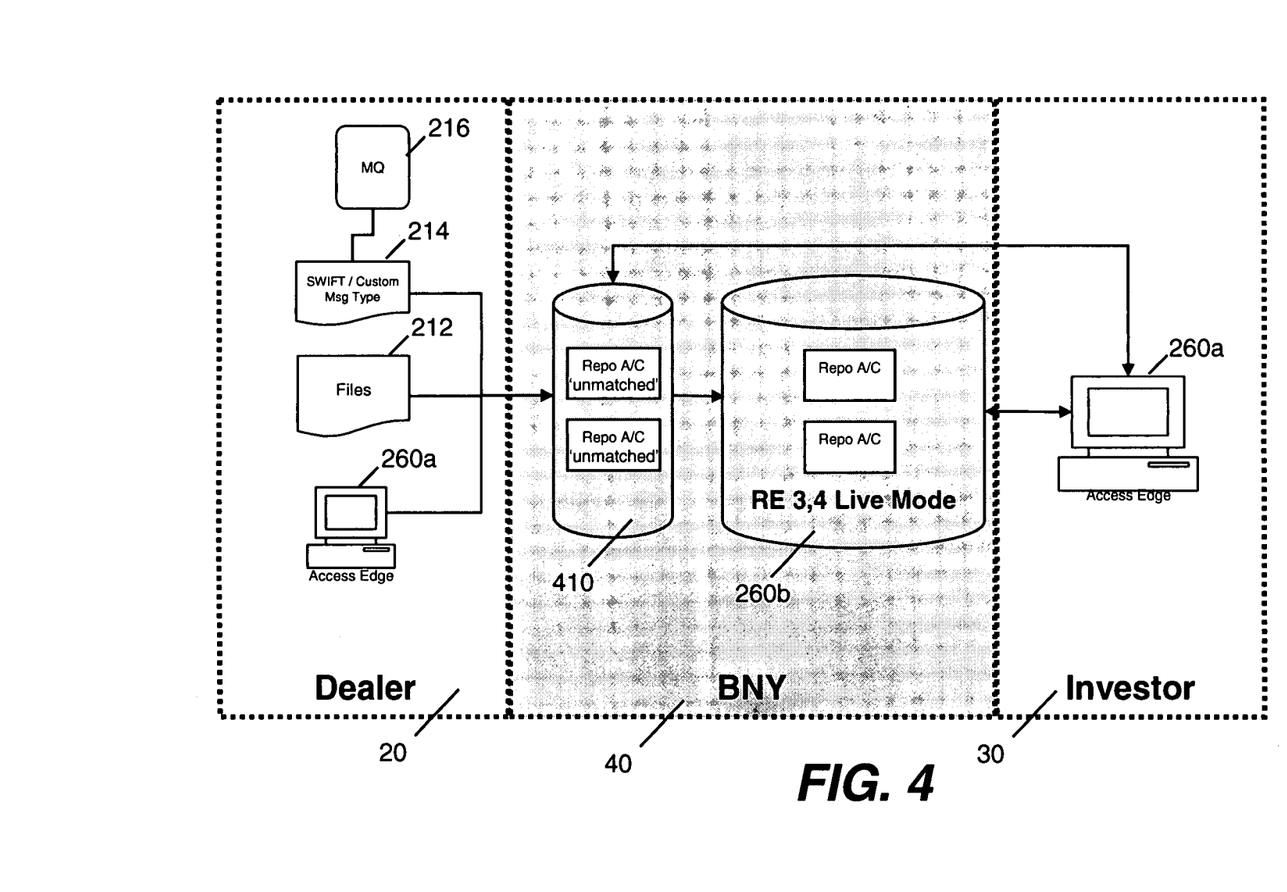

FIG. 4 depicts the embodiment of FIG. 3 from the perspective of dealer 20. In a preferred embodiment, deals that are submitted by dealer 20 are stored in a buffer database 410, rather than being uploaded directly into system 260a, 260b, which handles or clears individual transactions. Buffer database 410 can be thought of as a "hold" container in which unmatched repo allegements are stored until investor 30 approves or rejects the deals. Once approved, the "matched" deals are passed to system 260 with a time stamp and an investor ID.

Figure 5:
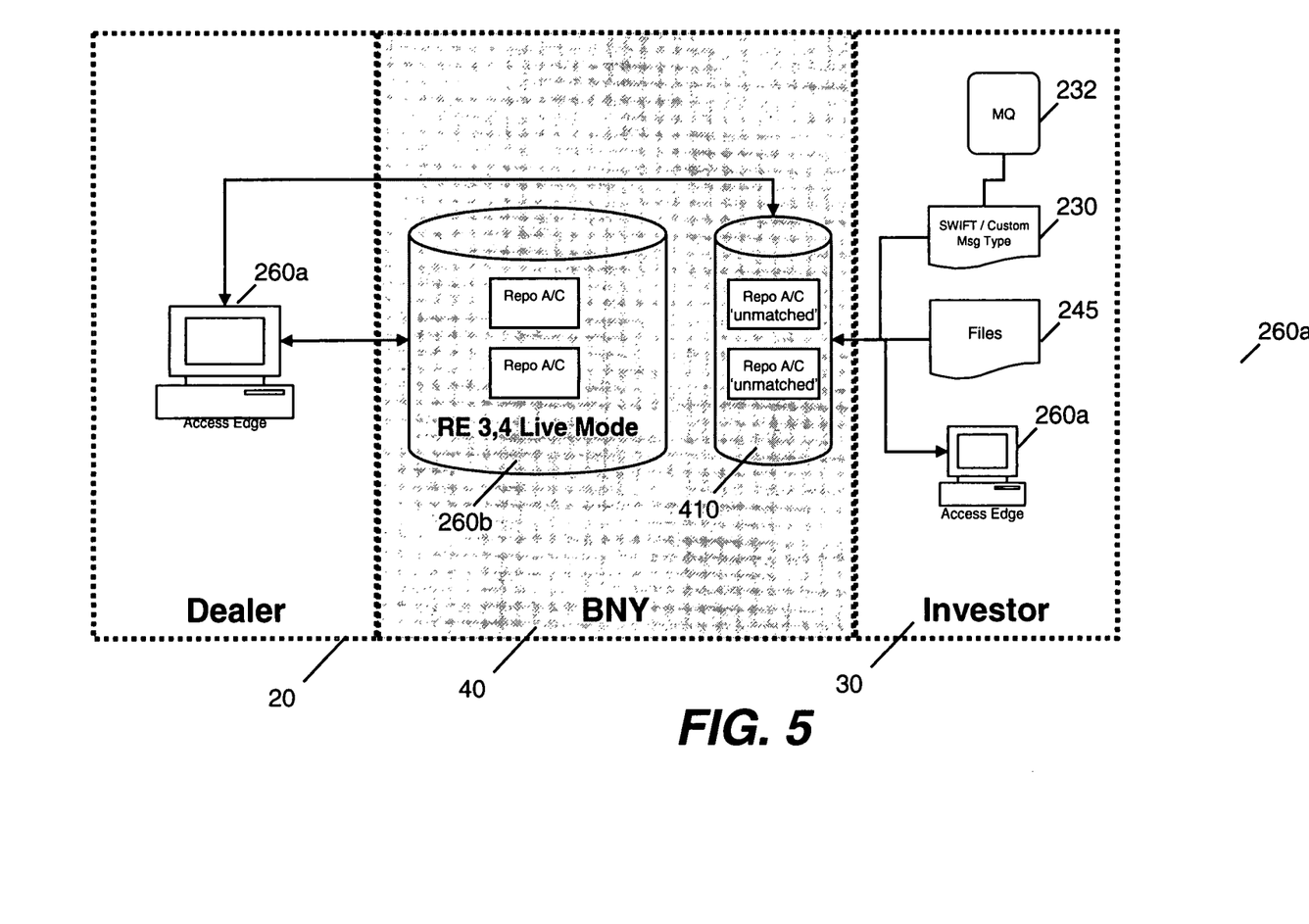

FIG. 5 depicts the embodiment shown in FIG. 3 from the perspective of investor 30. FIG. 5 is essentially a corollary to FIG. 4 in that buffer database 410 is disposed, logically, closer to investor 30. However, from a practical point of view, as long as each party can gain access to buffer database 410 the facilitation features of the present invention can be exploited.

It is noted that FIGS. 2-5 do not provide repo instruction matching per se. Rather, the embodiments depicted in FIGS. 2-5 provide a simpler mechanism by which investors and dealers can approve or reject repo deals without having to resort to telephone calls, faxes or even emails. By presenting a status screen to investors and/or dealers via the internet or private network, for example, embodiments of the present invention facilitate and make more efficient the finalization of repurchase agreement transactions by, at least, removing the requirement that personnel at a third party institution necessarily be involved in the transaction by receiving telephone calls, faxes or emails and manually reviewing the same.

Figure 6:
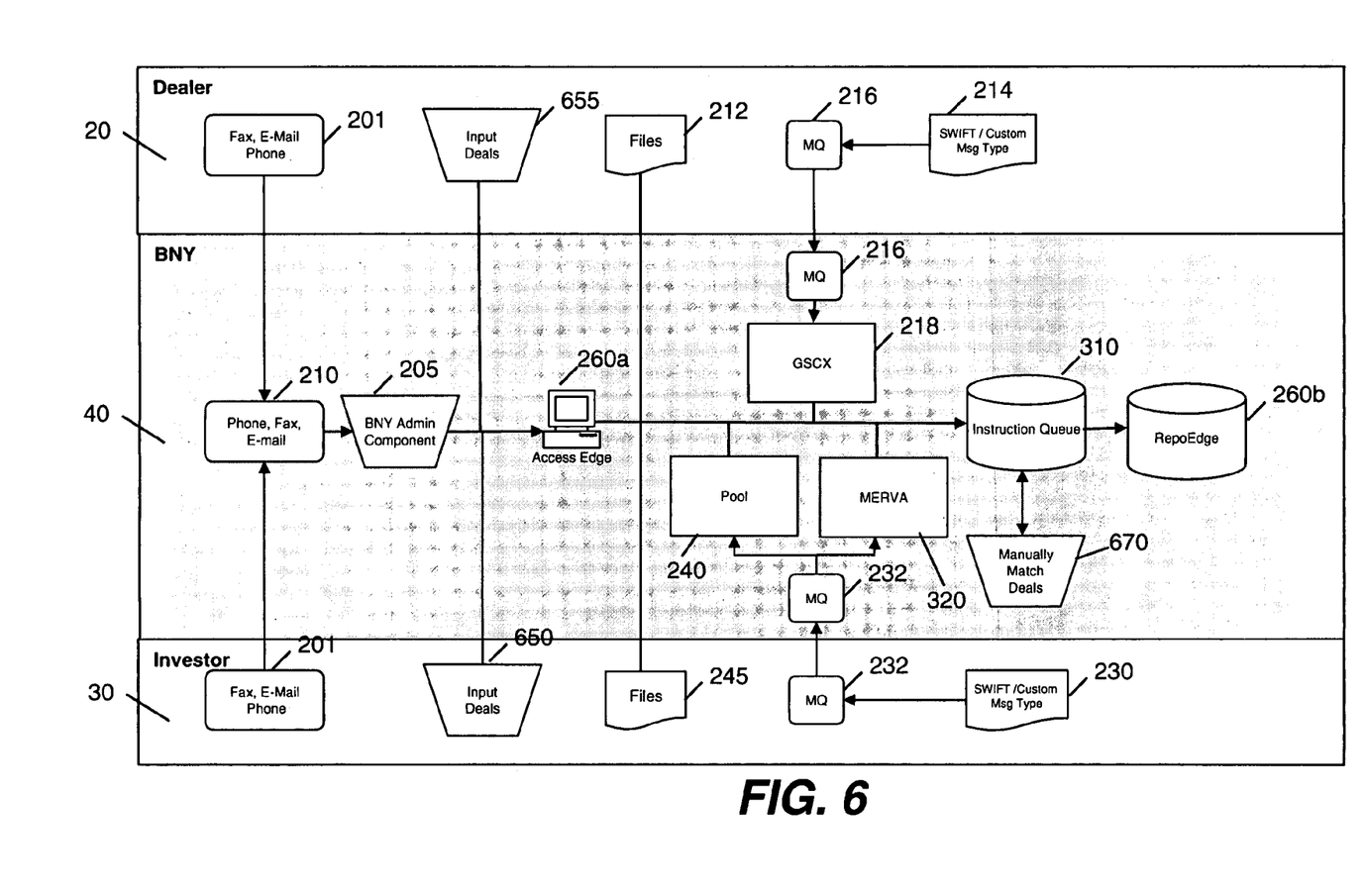
Figure 7:
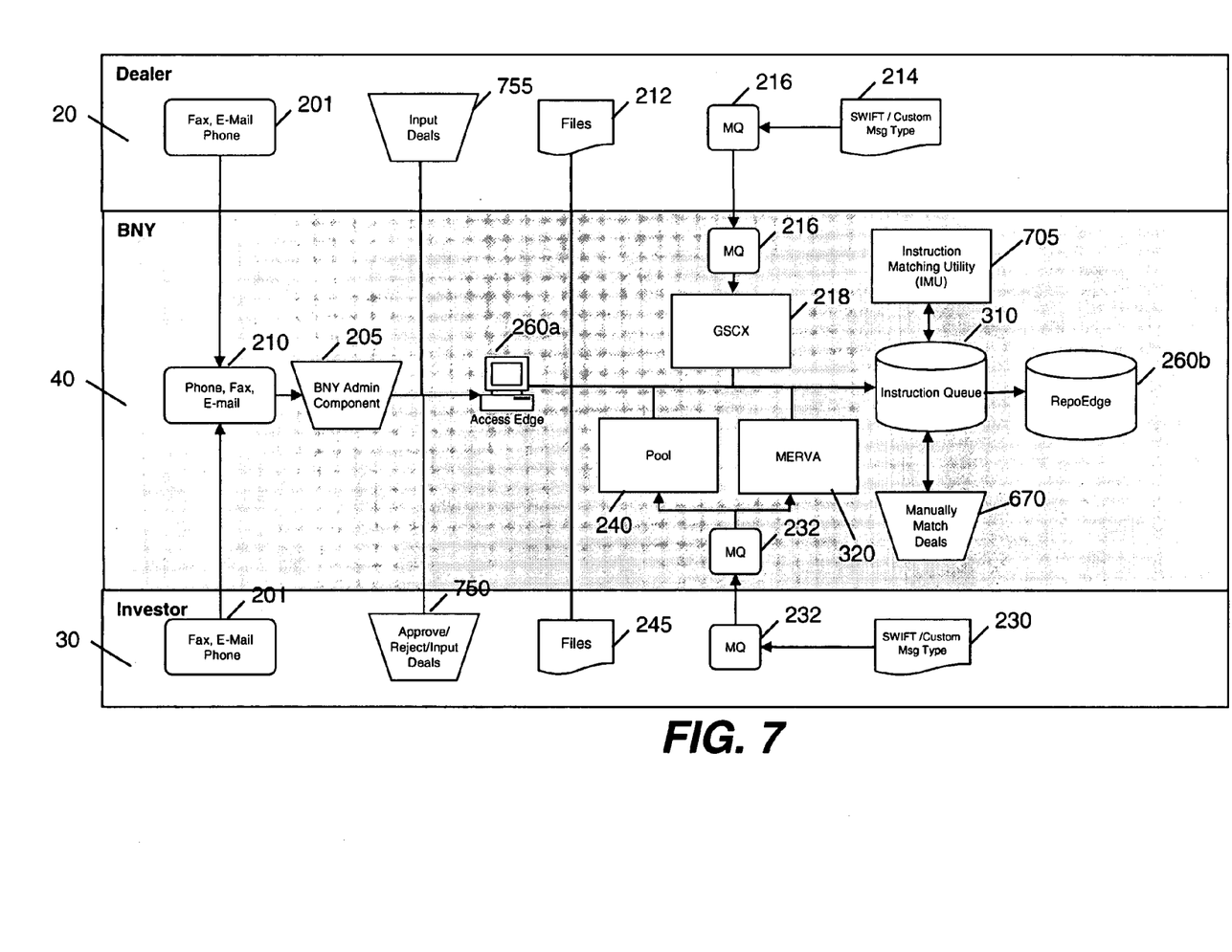

FIGS. 6 and 7 illustrate different levels of deal matching in accordance with the principles of the present invention. Referring first to FIG. 6, it can be seen that it is a combination of sorts of the embodiments depicted in FIGS. 2 and 3 in that GSCX 218, pool 240 and MERVA 320 are all included. Instruction queue 310 is also included. A first difference between FIG. 6 and FIGS. 2 and 3 is that instead of dealer 20 and investor 30 being able to manually approve or reject deals, these parties may only input deal terms as indicated by reference numerals 650 and 655. A second difference is that, rather than having the parties thereafter reject or approve deals, the embodiment shown in FIG. 6 includes a capability to manually match deals as indicated by reference numeral 670. Element 670 may be thought of as a manual instruction matching utility (IMU) that enables an administrator from, e.g., administrative component 205, to manually match dealer/trader and investor instructions, both for domestic and global allegements. It is noted that deals may be input by either party and may even be input using fax, email or telephone calls, as well as directly via input screens accessible over, e.g., the internet. The manual feature described herein may be utilized in the event that initial trade instructions do not match, and one or both of the principals to the trade are not able to amend their instruction. Since a trade must be matched for further processing, this feature allows the BNY administrator to "force match" a trade, allowing processing to continue, and for any incorrect aspect to be addressed by all three parties as soon as practicable.

FIG. 7 depicts an enhancement to the embodiment shown in FIG. 6. Here, investor 30 has the ability to both input deals and approve or reject deals input by dealer 20. More importantly, an automatic instruction matching utility (IMU) 705 is provided in addition to the manual match capability 670. That is, once deals are input by either the dealer 20 or investor 30 and thereafter approved, rather than having an administrative person match up the approved instructions, a module is implemented that automatically matches the approved instructions. This can be accomplished by any known means including, but not limited to, matching investor identifications, matching each of the terms deemed to be mandatory, and/or matching unique allegement identification numbers.

In yet another enhancement to this embodiment, or any of the previously described embodiments, the deal status screen displayed to dealer 20 and investor 30 may also permit deal modification such that in the event there is a discrepancy with a deal supposedly previously agreed to, the allegement stored in system 260*a*, 260*b* may be modified by either or both parties, and thereafter again approved by one or both parties.

As will be appreciated by those skilled in the art, the present invention provides several enhancements to the repo transaction space. Embodiments of the present invention allow investors to access a third party's repo transaction system in a much more direct and efficient manner, and preferably via a display accessible via the internet or private network or other electronic communication system. Moreover, embodiments of the present invention allow both dealers and investors to input deals or allegements into a repo system such that finalization of deals is more efficient. Moreover still, embodiments of the present invention provide systems and a methodology by which deals that have been approved by dealers and investors can be both manually matched and automatically matched to thereby complete (or clear) the initial stages of a repo transaction. Finally, those skilled in the art will also appreciate that the systems and methodologies described herein may also be applicable to, e.g., securities lending (borrow/pledge) agreements, and derivatives agreements, among others.

Although not described in detail herein, those skilled in the art will appreciate that the embodiments of the present invention can be implemented using well-known computer, database, communications and programming technology. Also, those skilled in the art will further appreciate that the embodiments described herein are not limited to any specific software package, operating system, communications network, protocol or computer hardware.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A computer-implemented method of providing tri-party instruction matching services by a third party intermediary after a completed trade, the method comprising:

receiving, by a computer processor, over the computer network and at the third party intermediary, finalized instructions from a first party regarding terms of the completed trade between the first party and a second party;

storing, in a memory device, the terms of the completed trade;

receiving, by the processor, via the computer network from the first party at the third party intermediary, a collateral allocation instruction associated with the completed trade;

matching, by the processor, the collateral allocation instruction with collateral information recorded in the memory device in a first party custody account maintained by the third party intermediary;

responsive to the collateral allocation instruction being matched to the collateral information recorded in the first party custody account, transferring, via the processor, matched collateral information associated with the collateral allocation instruction from the first party custody account into a second party custody account maintained for the benefit of the second party in accordance with the completed trade; and said processor being configured to ensure that all required terms of the completed trade are carried out prior to said transferring the matched collateral information.

2. The method of claim 1, wherein the terms of the completed trade comprise a repurchase agreement allegement.

3. The method of claim 1, wherein the terms of the completed trade comprise a securities lending agreement allegement.

4. The method of claim 1, wherein the terms of the completed trade comprise a derivatives agreement allegement.

5. The method of claim 1, wherein the third party is a financial institution.

6. The method of claim 5, wherein the third party is a bank.

7. The method of claim 1, wherein the first party is a securities dealer.

8. The method of claim 1, wherein the second party is an investor.

9. The method of claim 1, further comprising the processor causing the terms of the completed trade to be displayed on a display.

10. The method of claim 1, further comprising the processor receiving instructions from the second party regarding terms of the completed trade via the computer network.

11. The method of claim 1, further comprising receiving, by the processor over the computer network at the third party intermediary, instructions from the second party regarding terms of a different completed trade previously agreed upon between the first party and the second party.

12. The method of claim 11, further comprising receiving, by the processor over the computer network at the third party intermediary, an indication of approval of the terms of the different completed trade from the second party.

13. The method of claim 1, wherein the stored terms of the completed trade are modifiable by at least one of the first party and the second party via an interface with the processor.

14. The method of claim 1, wherein the completed trade is for a future dated transaction.

15. The method of claim 1, further comprising:
after completion of a finalized agreement associated with the completed trade, transferring by the processor, by the third party intermediary via the memory device, the collateral information associated with the finalized agreement to the first party; and
closing, by the third party intermediary via the processor, a segregated collateral position in the second party custody account.

16. A computer-implemented method of providing tri-party repurchase agreement transaction instruction matching services by an intermediary third party after a completed repurchase agreement, the method comprising:

receiving, via a computer network interfaced with a first party and a second party, first party collateral allocation instructions from the first party characterizing the completed repurchase agreement between the first party and the second party, the first party instructions being received by the intermediary third party over the computer network;

receiving, by the intermediary third party over the computer network, second party instructions from the second party, the second party instructions putatively characterizing said completed repurchase agreement between the first party and the second party;

the third party storing the first party instructions and the second party instructions in a memory device coupled to the computer network;

the third party using a computer processor coupled to the memory device and the computer network to compare the first party instructions to the second party instructions; and when at least a subset of the first party instructions and the second party instructions match each other, processing the first and second party instructions in the computer processor as an agreed-to repurchase agreement;

thereafter, receiving at the intermediary third party, collateral allocation instructions associated with the agreed-to repurchase agreement from the first party; and establishing, in the memory device at the intermediary third party, a segregated collateral position for the benefit of the second party in accordance with the collateral allocation instructions.

17. The method of claim 16, wherein the first party instructions comprise a repurchase agreement allegement.

18. The method of claim 16, wherein the third party is a financial institution.

19. The method of claim 18, wherein the third party is a bank.

20. The method of claim 16, wherein the first party is a securities dealer.

21. The method of claim 16, wherein the second party is an investor.

22. The method of claim 16, further comprising:
after completion of the agreed-to repurchase agreement, returning, by the intermediary third party, the collateral associated with the agreed-to-repurchase agreement to the first party; and
closing, by the intermediary third party, the segregated collateral position.

23. A system under control of a third party intermediary for matching collateral allocation instructions related to completed tri-party repurchase agreements between a first party and a second party, the system comprising:
a computer processor coupled to a network and controlled by a third party intermediary;
a memory device coupled to the computer processor, said memory device comprising a database in which terms of a repurchase agreement allegement for a completed tri-party repurchase agreement are stored;
an administrator component running in the computer processor and configured to have access to the database; and
an automatic instruction matching utility in communication with at least the database, the automatic instruction matching utility being operable to compare stored terms of the repurchase agreement allegement with collateral allocation instructions received from the first party to the repurchase agreement allegement, and further being operable to determine whether said collateral allocation instructions match said terms of the repurchase agreement allegement and to declare that said repurchase agreement allegement is binding upon said first party and said second party, wherein, if said repurchase agreement allegement is binding upon said first party and said second party as a final repurchase agreement, the computer processor and said memory device are configured to establish a segregated collateral position for the benefit of the second party representing collateral transferred from the first party in accordance with the collateral allocation instructions.

24. The system of claim 23, further comprising an instruction queue configured to capture the collateral allocation instructions that are to be matched for the completed tri-party repurchase agreement, and organizes said instructions for further processing by said automatic instruction matching utility.

25. The system of claim 23, further comprising a message queue.

26. The system of claim 25, wherein said message queue is configured to receive a message from a dealer and to forward the received message to the database through a securities clearance and settlement application.

27. The system of claim 25, wherein said message queue is configured to receive a message from an investor and to forward the received message to a pool configured to accept an instruction from one or more selected clients and to route the accepted instruction to the administrator component.

28. The system of claim 23, further comprising an interface to the computer processor through which said one party to the repurchase agreement allegement electronically approves or rejects one or more of said stored terms of the repurchase agreement allegement via a deal status screen.

* * * * *